US010380168B2

(12) United States Patent
Green (10) Patent No.: US 10,380,168 B2
(45) Date of Patent: *Aug. 13, 2019

(54) METHODS AND SYSTEM FOR DISTRIBUTING INFORMATION VIA MULTIPLE FORMS OF DELIVERY SERVICES

(71) Applicant: Greenfly, Inc., Newport Beach, CA (US)

(72) Inventor: Shawn David Green, Corona del Mar, CA (US)

(73) Assignee: Greenfly, Inc., Santa Monica, CA (US)

(*) Notice: Subject to any disclaimer, the term of this patent is extended or adjusted under 35 U.S.C. 154(b) by 586 days.

This patent is subject to a terminal disclaimer.

(21) Appl. No.: 15/161,542

(22) Filed: May 23, 2016

(65) Prior Publication Data

US 2017/0103067 A1    Apr. 13, 2017

Related U.S. Application Data (63) Continuation of application No. 14/690,292, filed on Apr. 17, 2015, now Pat. No. 9,348,823, which is a
(Continued)

(51) Int. Cl.
G06F 15/16 (2006.01)
G06F 17/00 (2019.01)
(Continued)

(52) U.S. Cl.
CPC ............ *G06F 16/435* (2019.01); *G06F 15/16* (2013.01); *G06F 16/437* (2019.01);
(Continued)

(58) Field of Classification Search
CPC .... G06F 16/435; G06F 16/437; G06F 16/438; G06F 16/9535; G06F 15/16
(Continued)

(56) References Cited

U.S. PATENT DOCUMENTS 6,938,005 B2    8/2005    Iverson et al.
7,577,979 B2    8/2009    Feinleib et al.
(Continued)

OTHER PUBLICATIONS

PCT International Search Report and Written Opinion dated May 15, 2017, Application No. PCT/US2017/017182, 9 pp.
(Continued)

*Primary Examiner* — Nicholas R Taylor
*Assistant Examiner* — Ho T Shiu
(74) *Attorney, Agent, or Firm* — Knobbe, Martens, Olson & Bear LLP (57) ABSTRACT

Systems and methods of managing content and content requests are described. A data store of profiles of potential content contributors is provided. A request from a first source for content comprising content criteria is received, the content criteria comprising content contributor characteristics and content subject matter. Based on the content contributor characteristics and the profiles, at least a first potential content contributor is identified. At least a portion of the content request content criteria is transmitted to the first potential content contributor. If recorded content is received from the first content contributor, the first source is provided with access to the received recorded content. At least partly in response to acceptance by the first source of the received recorded content, the first source is enabled to publish the accepted received recorded content.

13 Claims, 7 Drawing Sheets

Related U.S. Application Data continuation of application No. 14/299,977, filed on Jun. 9, 2014, now Pat. No. 9,015,251, which is a continuation of application No. 14/052,626, filed on Oct. 11, 2013, now Pat. No. 8,782,140.

(60) Provisional application No. 61/779,096, filed on Mar. 13, 2013.

(51) Int. Cl.
| | | |
|---|---|---|
| G06Q 30/00 | (2012.01) | |
| G06Q 50/00 | (2012.01) | |
| G06F 16/435 | (2019.01) | |
| H04L 12/58 | (2006.01) | |
| G06F 16/438 | (2019.01) | |
| H04N 21/475 | (2011.01) | |
| H04N 21/4784 | (2011.01) | |
| H04L 29/08 | (2006.01) | |
| G06F 16/958 | (2019.01) | |

(52) U.S. Cl.
CPC ........... *G06F 16/438* (2019.01); *G06Q 50/01* (2013.01); *H04L 51/32* (2013.01); *H04L 67/22* (2013.01); *H04L 67/306* (2013.01); *H04N 21/4756* (2013.01); *H04N 21/4758* (2013.01); *H04N 21/4784* (2013.01); *G06F 16/958* (2019.01); *H04L 67/06* (2013.01)

(58) Field of Classification Search
CPC .... G06F 16/958; G06Q 50/01; G06Q 10/101; G06Q 50/10; H04L 51/32; H04L 65/4084; H04N 21/4758; H04N 21/4788
See application file for complete search history.

(56) References Cited

U.S. PATENT DOCUMENTS

| | | |
|---|---|---|
| 7,757,254 B2 | 7/2010 | Shoff et al. |
| 7,809,603 B2 | 10/2010 | Steelberg et al. |
| 8,024,467 B2 | 9/2011 | Humphrey et al. |
| 8,032,470 B1 | 10/2011 | Heidenreich |
| 8,607,295 B2 | 12/2013 | Bhatia et al. |
| 8,612,243 B2 | 12/2013 | McGill et al. |
| 8,782,140 B1 | 7/2014 | Green |
| 9,015,251 B2 | 4/2015 | Green |
| 9,063,972 B1 | 6/2015 | Marra |
| 9,280,610 B2 | 3/2016 | Gruber |
| 2002/0016969 A1 | 2/2002 | Kimble |
| 2002/0073177 A1 | 6/2002 | Clark et al. |
| 2003/0229900 A1 | 12/2003 | Reisman |
| 2006/0174316 A1 | 8/2006 | Gregorian et al. |
| 2006/0253542 A1 | 11/2006 | McCausland et al. |
| 2007/0089151 A1 | 4/2007 | Moore et al. |
| 2007/0162566 A1 | 7/2007 | Desai et al. |
| 2008/0103906 A1 | 5/2008 | Singh |
| 2008/0120324 A1 | 5/2008 | Davis |
| 2008/0147741 A1* | 6/2008 | Gonen .................. G06Q 10/06 |
| 2008/0177752 A1 | 7/2008 | Kulkarni et al. |
| 2008/0209480 A1 | 8/2008 | Eide et al. |
| 2008/0244681 A1 | 10/2008 | Gossweiler et al. |
| 2008/0247543 A1 | 10/2008 | Mick et al. |
| 2009/0044235 A1 | 2/2009 | Davidson |
| 2009/0060289 A1 | 3/2009 | Shah et al. |
| 2009/0089294 A1 | 4/2009 | Davis et al. |
| 2009/0172129 A1 | 7/2009 | Singh et al. |
| 2009/0204885 A1 | 8/2009 | Ellsworth et al. |
| 2009/0210291 A1 | 8/2009 | Safar |
| 2009/0210808 A1 | 8/2009 | West |
| 2009/0328087 A1 | 12/2009 | Higgins et al. |
| 2010/0088394 A1 | 4/2010 | Barbieri et al. |
| 2010/0293598 A1 | 11/2010 | Collart et al. |
| 2011/0004831 A1 | 1/2011 | Steinberg |
| 2011/0082808 A1 | 4/2011 | Beykpour et al. |
| 2011/0106835 A1 | 5/2011 | Lauridsen |
| 2011/0173214 A1 | 7/2011 | Karim |
| 2011/0225239 A1 | 9/2011 | Kansal |
| 2011/0225508 A1 | 9/2011 | Steelberg et al. |
| 2011/0264521 A1 | 10/2011 | Straka |
| 2011/0264599 A1 | 10/2011 | Dalton |
| 2011/0276423 A1 | 11/2011 | Davidson |
| 2011/0289157 A1 | 11/2011 | Pirnazar |
| 2011/0311205 A1 | 12/2011 | McClanahan |
| 2012/0042263 A1 | 2/2012 | Rapaport |
| 2012/0072835 A1 | 3/2012 | Gross |
| 2012/0096041 A1 | 4/2012 | Rao |
| 2012/0130807 A1 | 5/2012 | Steelberg et al. |
| 2012/0185238 A1 | 7/2012 | Bhatti |
| 2012/0192225 A1 | 7/2012 | Harwell et al. |
| 2012/0192239 A1 | 7/2012 | Harwell |
| 2012/0233000 A1 | 9/2012 | Fisher |
| 2012/0233646 A1 | 9/2012 | Coniglio et al. |
| 2012/0236201 A1 | 9/2012 | Larsen |
| 2012/0254301 A1 | 10/2012 | Fiero |
| 2012/0272164 A1 | 10/2012 | Polonsky |
| 2012/0304237 A1 | 11/2012 | Harwell et al. |
| 2012/0316962 A1 | 12/2012 | Rathod |
| 2012/0317227 A1 | 12/2012 | Bettinger |
| 2013/0014136 A1 | 1/2013 | Bhatia |
| 2013/0080565 A1 | 3/2013 | van Coppenolle |
| 2013/0086185 A1 | 4/2013 | Desmarais |
| 2013/0086631 A1 | 4/2013 | Archer et al. |
| 2013/0159295 A1 | 6/2013 | Gross |
| 2013/0166649 A1 | 6/2013 | Atzmon |
| 2013/0226675 A1 | 8/2013 | Senra |
| 2013/0226708 A1 | 8/2013 | Good et al. |
| 2013/0227384 A1 | 8/2013 | Good et al. |
| 2013/0227596 A1 | 8/2013 | Pettis et al. |
| 2013/0238444 A1 | 9/2013 | Munaco |
| 2013/0254804 A1 | 9/2013 | Diaz Perez |
| 2013/0282839 A1 | 10/2013 | Alcala |
| 2013/0283301 A1 | 10/2013 | Avedissian |
| 2013/0304527 A1 | 11/2013 | Santos, III |
| 2013/0304575 A1 | 11/2013 | Fetyko |
| 2013/0304820 A1 | 11/2013 | Vasquez |
| 2013/0311906 A1 | 11/2013 | Mackin |
| 2013/0312049 A1 | 11/2013 | Niyogi et al. |
| 2013/0321388 A1 | 12/2013 | Locke |
| 2013/0332213 A1 | 12/2013 | Heggen |
| 2013/0332603 A1 | 12/2013 | Hutten |
| 2014/0013228 A1 | 1/2014 | Hutten |
| 2014/0095637 A1 | 4/2014 | Cropper |
| 2014/0108372 A1 | 4/2014 | Oh |
| 2014/0108547 A1 | 4/2014 | Rao |
| 2014/0136554 A1 | 5/2014 | Moradi |
| 2014/0137144 A1 | 5/2014 | Jarvenpaa |
| 2014/0150029 A1 | 5/2014 | Avedissian |
| 2014/0171039 A1 | 6/2014 | Bjontegard |
| 2014/0173644 A1 | 6/2014 | Ball |
| 2014/0173648 A1 | 6/2014 | Ball |
| 2014/0181120 A1 | 6/2014 | Sullivan |
| 2014/0181196 A1 | 6/2014 | Sullivan |
| 2014/0188741 A1* | 7/2014 | Lustberg ................ G06Q 30/02 705/319 |
| 2014/0192199 A1 | 7/2014 | Tan et al. |
| 2014/0195675 A1 | 7/2014 | Silver |
| 2014/0200974 A1 | 7/2014 | Morin |
| 2014/0211090 A1 | 7/2014 | Faratzis |
| 2014/0214522 A1 | 7/2014 | Skollar |
| 2014/0237492 A1 | 8/2014 | Jones |
| 2014/0237497 A1 | 8/2014 | Jones |
| 2014/0253727 A1 | 9/2014 | Sadrieh |
| 2014/0280540 A1 | 9/2014 | Wurtele |
| 2014/0282016 A1 | 9/2014 | Hosier |
| 2014/0297652 A1 | 10/2014 | Stevens |
| 2014/0313341 A1 | 10/2014 | Stribling |
| 2014/0372910 A1 | 12/2014 | Alford Mandzic |
| 2015/0058380 A1 | 2/2015 | Polonsky |
| 2015/0067102 A1 | 3/2015 | Tsarkova |
| 2015/0134684 A1 | 5/2015 | Montana |
| 2015/0220526 A1 | 8/2015 | Green |
| 2015/0312354 A1 | 10/2015 | Boyle |
| 2016/0006981 A1 | 1/2016 | Bauman |

(56) References Cited

U.S. PATENT DOCUMENTS

| | | |
|---|---|---|
| 2016/0007083 A1 | 1/2016 | Gurha |
| 2017/0068361 A1* | 3/2017 | Imbruce ................ G06F 1/1694 |
| 2017/0099512 A1 | 4/2017 | Osminer |
| 2017/0134783 A1 | 5/2017 | Boyle |
| 2017/0134831 A1 | 5/2017 | Talukder |

OTHER PUBLICATIONS http://www.filmindependent.org/blogs/check-out-chideo-its-a-cool-idea-for-a-good-cause/#.UI485IN0Azq, "Check Out Chideo: It's a Cool Idea for a Good Cause," Sep. 2013.

https://itunes.apple.com/us/app/chideo/id666170718?mt=8, "Chideo," Sep. 2013.

JockTalk Startup Looks to Boost Pro Athletes' Social Media Leverage, http://mashable.com/2012/04/18/jocktalk-startup/ (2012).

JockTalk, http://web.archive.org/web/20121025092745/http://www.jocktalk.com/ (Oct. 25, 2012).

\* cited by examiner

FIG. 1

FIG. 2 personal information

| first | last |

| email address |

| cell phone number | why?

| twitter username | *optional i prefer to be contacted via:

email [====----------] cell phone profession sports [====----------] entertainment location north america [======--------] europe

*FIG.3* area of expertise athlete |▭━━━━━━━| non-athlete location

| country ▽ |

| state/region ▽ | city ▽ | professional details

| sport ▽ |

| position ▽ |

INBOX (60)

| | | |
|---|---|---|
| Acme Sports Network | what do you think about the call... | august 20 ⊗ |
| SRN SPORTS RADIO NETWORK | what do you think about the call... | august 8 ◯ |
| LEAGUE TV | what do you think about the call... | march 1 ✓ |
| THE FISHING CHANNEL | what do you think about the call... | may 15 |
| FOOTBALL COMMUNICATIONS NETWORK | what do you think about the call... | january 24 |
| Acme Sports Network | what do you think about the call... | august 20 |
| SRN SPORTS RADIO NETWORK | what do you think about the call... | august 20 |
| LEAGUE TV | what do you think about the call... | august 20 |
| THE FISHING CHANNEL | what do you think about the call... | august 20 |
| FOOTBALL COMMUNICATIONS NETWORK | what do you think about the call... | august 20 |

What do you think of that play made by Jacob Doe?

record your response question worth: 50 points question status: unanswered share question with friend

*FIG. 7*

METHODS AND SYSTEM FOR DISTRIBUTING INFORMATION VIA MULTIPLE FORMS OF DELIVERY SERVICES

Any and all applications for which a foreign or domestic priority claim is identified in the Application Data Sheet as filed with the present application, are hereby incorporated by reference in their entirety under 37 CFR 1.57.

BACKGROUND OF THE INVENTION

Field of the Invention

The present invention is related to media collection and distribution.

Description of the Related Art

Social networking and microblogs enable users to quickly share information. However, conventional media, such as television, radio, and newspapers, typically lack the immediacy and interactivity offered by social networks and microblogs.

Social network platforms also suffer from certain deficiencies. For example, conventional social networks often fail to provide a well-defined and recurring system in place for social influencers to monetize the content that they create.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain example embodiments provide a system and process that enable users to share information, content, and items. Such shared information and content may be distributed over one or more distribution channels.

Certain optional embodiments provide a system and method that enables a publisher to submit a request for content to a system, such as a content distribution facilitation system. The system may selectively transmit the request to one or more potential respondents. The potential respondents may optionally be identified by the system based at least in part on the request and/or other criteria specified by the requester. The request may optionally specify an expiration date/time, wherein if the request is not satisfied by the specified date/time, the request may expire, and potential respondents may no longer accept the request.

One or more potential respondents may provide content in response to the request. The content may be newly created content, that is created in response to the request, and/or the content may comprise preexisting, previously recorded content. The system may receive and provide the response, optionally including the content, to the requester, or the responses may be provided directly to the requester without traversing the content distribution facilitation system.

The requester may optionally evaluate the content from some or all of the respondents and may accept one or more content items (e.g., to use and distribute via one or more avenues of distribution). The acceptance indication may optionally be provided via a user interface presented to the requester, and the acceptance indication may be received by the content distribution facilitation system. The respondent(s) whose content was accepted may optionally be notified of the acceptance via the content distribution facilitation system or otherwise (e.g., via email, a short messaging service, an instant message, a dedicated application, a webpage or otherwise). The respondent(s) whose content was accepted (sometimes referred to herein as a content contributor) may optionally be compensated (e.g., via currency or other item of value) directly by the requester and/or by the content distribution facilitation system operator.

In an example embodiment, a data store of profiles of potential content contributors is provided. A request from a first requester for content comprising content criteria is received, the content criteria comprising content contributor characteristics and content subject matter. Based on the content contributor characteristics and the profiles, at least a first potential content contributor is identified. At least a portion of the content request content criteria is transmitted to the first potential content contributor. Recorded content is received from the first content contributor. The first requester is provided with access to the received recorded content. At least partly in response to acceptance by the first requester of the received recorded content, the first requester is enabled to publish the accepted received recorded content for at least a first period of time.

An example aspect provides a method of managing content and content requests, the method comprising: maintaining a data store of profiles of potential content contributors; receiving, at a content distribution facilitation system, a request for new content from a first requester, the content request comprising content criteria, comprising: content contributor characteristics; content subject matter; and/or content length; based at least on the content contributor characteristics included in the request and the profiles of potential content contributors, identifying, by the content distribution facilitation system, at least a first plurality of potential content contributors; transmitting, by the content distribution facilitation system, at least a portion of the content request content criteria to the first plurality of potential content contributors; receiving, by the content distribution facilitation system, recorded content from one or more of the first plurality of potential content contributors; providing, via the content distribution facilitation system, the first requester with access to the received recorded content; receiving, by the content distribution facilitation system, acceptance by the first requester of at least one item of the received recorded content, and enabling the first requester to publish the accepted received recorded content.

An example aspect provides a method of managing content and content requests, the method comprising: maintaining a data store of profiles of potential content contributors; receiving, at a content distribution facilitation system, a request for content from a first requester, the content request comprising content criteria, comprising: content contributor characteristics and/or content subject matter; based at least on the content contributor characteristics included in the request and the profiles of potential content contributors, identifying, by the content distribution facilitation system, at least a first potential content contributor; transmitting, by the content distribution facilitation system, at least a portion of the content request content criteria to the first potential content contributor; receiving, by the content distribution facilitation system, recorded content from the first content contributor; providing, via the content distribution facilitation system, the first requester with access to the received recorded content; receiving, by the content distribution facilitation system, acceptance by the first requester of the received recorded content, and enabling the first requester to publish the accepted received recorded content.

An example aspect provides a system, comprising: at least one computing device comprising hardware; non-transitory memory coupled to the at least one computing device that stores instructions that when executed by the at least one computing device cause, at least in part, the system to perform operations comprising: maintaining a data store of profiles of potential content contributors; receiving, at a content distribution facilitation system, a request for content from a first requester, the content request comprising content criteria, comprising: content contributor characteristics; content subject matter; based at least on the content contributor characteristics included in the request and the profiles of potential content contributors, identifying at least a first potential content contributor; transmitting at least a portion of the content request content criteria to the first potential content contributor; receiving recorded content from the first content contributor; providing, via the content distribution facilitation system, the first requester with access to the received recorded content; receiving acceptance by the first requester of the received recorded content; and enabling the first requester to publish the accepted received recorded content.

An example aspect provides a non-transitory memory storing instructions that when executed by a computer system comprising at least one computing device, cause the system to perform operations comprising: maintaining a data store of profiles of potential content contributors; receiving, at a content distribution facilitation system, a request for content from a first requester, the content request comprising content criteria, comprising: content contributor characteristics; content subject matter; based at least on the content contributor characteristics included in the request and the profiles of potential content contributors, identifying at least a first potential content contributor; transmitting at least a portion of the content request content criteria to the first potential content contributor; receiving recorded content from the first content contributor; providing, via the content distribution facilitation system, the first requester with access to the received recorded content; receiving acceptance by the first requester of the received recorded content; and enabling the first requester to publish the accepted received recorded content.

BRIEF DESCRIPTION OF THE DRAWINGS

Embodiments will now be described with reference to the drawings summarized below. These drawings and the associated description are provided to illustrate example embodiments, and not to limit the scope of the invention.

DETAILED DESCRIPTION

Systems and methods are described that enable users to share information, content, and items. Such shared information and content may be distributed over one or more distribution channels. For example, certain embodiments enable requests for content to selectively be submitted to a specific target group of potential responders, such as athletes, actors, agents, athlete scouts, medical experts, opinion leaders, industry experts, celebrities, a social or working group, or the like. Optionally, the request may be directed to a specific person or group.

For example, certain embodiments provide a system that enables a publisher to submit a request for such content to a content distribution facilitation system, which may then selectively transmit the request to one or more potential respondents. The potential respondents may be identified by the system based at least in part on the request and/or other criteria specified by the requester. The request may specify an expiration date/time, wherein if the request is not satisfied by the specified date/time, the request may expire, and potential respondents may no longer accept the request. By way of example, the publisher may be an entity that needs information, commentary, or other content, such as a producer or distributor of a television program (e.g., a live sports program, such as a game broadcast), a radio program, or an online newspaper. By way of further example, the publisher may be a venue, such as a stadium, where the responder's submission in response to the request may be published on an electronic sign or display (e.g., a large-screen television) within the venue.

The one or more potential respondents may provide content in response to the request. The content may be newly created content, that is created in response to the request or the content may be preexisting, previously recorded content. The system may receive and provide the response, including the content, to the requester, or the responses may be provided directly to the requester without traversing the content distribution facilitation system. The requester may then evaluate the content from some or all of the respondents and accept one or more to use and distribute via one or more avenues of distribution. The acceptance indication may be provided via a user interface presented to the requester, and the acceptance indication may be received by the content distribution facilitation system. The respondent(s) whose content was accepted may be notified of the acceptance via the content distribution facilitation system or otherwise (e.g., via email, a short messaging service, an instant message, a dedicated application, a webpage or otherwise). The respondent(s) whose content was accepted (sometimes referred to herein as a content contributor) may be compensated directly by the requester and/or by the content distribution facilitation system operator.

Optionally, the compensation may be timed/event based. For example, if the content is received during a live sporting event broadcast where the content may be used, the responder may receive a relatively higher level than if the content is received after the live sporting event for use in a news report reporting on the sporting event. Optionally, a responder may receive a relatively lower compensation for providing the content if the content is submitted in response to the request, but is not accepted. Optionally, if the content is not accepted by the requester within a specified period of time, the ability of the requester to accept the content may expire, and the content may be offered to others on an exclusive (or non-exclusive) basis. For example, if the content is not accepted by the requester within a specified period of time, the system may offer the content to other potential users (e.g., media partners), optionally with a designated acceptance period. Once that acceptance period passes without a purchase by such a media partner, or if the responder indicated that they do not want the content offered to other media partners, then the content may be automatically published out to social media (e.g., a microblog, a blog, a social network page, etc.), some or all of which may be hosted by the system or by third party systems. For example, the system may host a website where a given responder/content contributor (e.g., an athlete or celebrity) is provided a page or site, where the content provided in a response, as well as other content (e.g., videos, photos, text, conversations) may be posted in association with ads or sponsorships, enabling richer fan interactions, and generating revenue for such content providers.

Optionally, the requester may specify different amounts of compensation for different response times. For example the requester may specify that the responder will receive $500 if the response is received within 5 minutes of the request being submitted, $300 if the response is received between 6-30 minutes of the request being submitted, and $150 if the response is received between 31 minutes and 4 hours of the request being submitted. In this example, the requester may specify that the offer expires if the content is not received within 4 hours of the request being submitted. In addition to or instead of specifying relative time, the request may specify absolute time periods. For example, requester may specify that the responder will receive $500 if the response is received by 1:15 PM, $300 if the response is received between 1:16 PM-1:45 PM, and $150 if the response is received between 1:46 PM and 5:45 PM.

Optionally, a point system may be used in addition to or instead of the currency payment system described herein. For example, a responder may be awarded a first set of points (e.g., 5 points or other number of points) for submitting a response to a requester (e.g., video, audio, and/or text media), and may be awarded a second number of points (e.g., 3 to 10 times as many points as the first number of points), if the requester uses the submitted response (e.g., by broadcasting it via television, radio, webpage, SMS message, or email). Optionally, the system may enable the responder to convert the points to an item of value, such as currency, a gift card, a product, and/or a service. Optionally, some or all of the items of value may be provisioned by a sponsor seeking to advertise their product and/or service. For example, a golf equipment company may provide golfing equipment which the responder would "purchase" via the system or otherwise using points. The sponsor may obtain the benefit of having a well-known responder (e.g., a well-known athlete) use their product and/or service, and may optionally be entitled to identify, via advertisements or otherwise, that the responder uses the sponsor's products and/or services. Optionally, the sponsor may specify that in order to receive the item of value, the responder needs to include the item in a video response that includes the responder (e.g., for product placement). Optionally, the responder may need to have at least a threshold amount of points in order to exchange the points for an item of value. Optionally, a given point may be assigned a certain currency value (e.g., each point or each 10 points equal one dollar).

The requester may be provided with an exclusive right to utilize the accepted content for a specified time period, number of views, and/or for one or more specified distribution channels (e.g., television, radio, print, etc.). For example, the length of exclusivity may be based on the fee, wherein the relatively larger the fee for a given item of content, the relatively longer the period of exclusivity. Optionally, once the period of exclusivity ends, the content may be automatically published via one or more other publication channels. For example, the content, or a portion thereof, may automatically be published on a micro-blogging site, a conventional blog, a social networking site, via email, via short messaging service message, and/or otherwise. Optionally, at least partly in response to the expiration of the exclusivity or a date related thereto, a notification is posted on a social networking site associated with the publisher and/or the content contributor (or elsewhere) regarding the loss of exclusivity and/or indicating (with text, a link, or otherwise) where else the content can now be found (e.g., on the content contributor's social network page). Instead or in addition, the notification may be provided via a microblog, text message, email, or otherwise. The publication channels may be associated with the responder and/or the system operator. For example, the content may be published on the contributor's social networking page and/or microblog after the exclusivity expiration. Advertising (e.g., from sponsors that pay a fee) may be provided on such a site, where the revenue may be shared by the responder and the content distribution facilitation system. During the period of exclusivity, the system may ensure that the accepted content is not distributed via the system to other requesters during the period. Optionally, when an exclusivity period expires, a notification may be transmitted by the system to the requester and to the corresponding responder regarding the expiration of the exclusivity.

Optionally, the requestor is not granted exclusive rights. Optionally, the requester is assigned ownership of the content.

For example, if during a live sporting event, such as a baseball game, a notable event occurs (e.g., a player hitting four home runs in a game, a record breaking event, a unusual event, a notable statistic, etc.), a broadcaster of the live event may want to request that other players that have achieved the same feat provide commentary regarding the feat while the game is still in progress to enhance the excitement of the game broadcast and to add a social networking aspect to the game broadcast. The broadcaster may submit, via a user interface provided by the system, a request for such commentary during the game (e.g., almost immediately after the event occurred) and may specify that the query is to be directed to athletes, and in particular to other players that have previously achieved the feat. The request may specify the subject that the athlete is to discuss (e.g., how they feel regarding another athlete achieving the feat). The requester may also specify a response deadline, the media type for the response (e.g., video (including an audio track), static images (e.g., photographs), audio only track, text, etc.), and other response criteria via the user interface. For example, the response criteria may specify a response length.

Optionally, potential responder's may have an application or application programming interface (API) installed on their devices that detect certain actions being performed by the responders. For example, the application may detect in real time if a responder is viewing a program, such as a sporting event, and may identify which program is being watched, and may transmit such detection to the content distribution facilitation system. Optionally, the application prompts the potential responder to indicate (e.g., by tapping on a corresponding control or otherwise) that he or she is (or is not) watching a specific program, and the application will cause the indication to be transmitted to the content distribution facilitation system. The requester may specify that the request is to be provided to potential responders that are currently watching a specified program. For example, the request may specify that the responder is to comment on an event that just took place in the program (e.g., hitting of a home run or a triple play).

Optionally, in addition to or instead of requesting a recorded submission, the requester may request that a responder participate in a live interview/discussion, either substantially immediately (e.g., within 1 minute, 5, minutes, 10 minutes, 30 minutes, or 1 hour of the request) or at some specified date/time (e.g., Sep. 30, 2013 at 11:00 AM). One or more responders may agree to the request and the requester may engage one or more of such responders. Optionally, a responder may participate in the interview/discussion using the responder's mobile device (e.g., mobile telephone) camera and/or microphone to capture video and/or voice. Other devices, such as a desktop computer, laptop computer, tablet computer, television, game console, etc. that are coupled to a camera and/or microphone may be used to capture the responder's video and/or voice and to transmit them in substantially real-time (e.g., with less than a second lag) via the system described herein or other system. Likewise, the responder device may be used to receive video and audio from the requester, enabling the requester and responder to engage in an audio-video discussion.

By way of illustration, if the response is to be a video or audio response, the request may specify the minimum and/or maximum time length of the response, and if the response is text, the request may specify minimum and/or maximum number of words and/or characters. By way of further example, if the response is video or a still image, the response criteria may include orientation (e.g., landscape or portrait), which may be selected based at least in part to the target content reproduction device (e.g., television sets, phones, tablet computers, desktop computers, etc.).

The requester may also indicate a desired period of time of exclusivity and/or a desired exclusive form of distribution. Corresponding fees may be specified by the system to the requester for different lengths of exclusivity and/or avenues of distribution. Optionally, the requester may specify the fees the requester is willing to pay for the same, as part of the request criteria.

Using the requester criteria, the system may search its database of potential responders, such as athletes, actors, celebrities, experts, designers, artists, musicians, etc., for potential responders whose stored profiles match the requester criteria and that have agreed to receive such requests. For example, the database may include profiles of athletes, such as baseball players, which may include various statistics, events, and achievements from some or all of the games they have played in (including those that result from an aggregation of achievements over multiple games, such as how many games the player has played in a row, or how may games in a row the player has hit a home run). The system may transmit the request to matching potential responders, where the request may include some or all of the requester specified response criteria. By way of example, the request may be transmitted to a potential responder via email, short messaging service (e.g., SMS, MMS, etc.), instant messaging service, an application (sometimes referred to as an "app") downloaded to or otherwise installed on a potential recipient device (e.g. a mobile phone, tablet computer, entertainment device, etc.), and/or otherwise. For example, as noted above, the notification may be provided as an "in-app" notification by an application installed on the responder's mobile phone, tablet computer, or entertainment device.

Optionally, a given potential responder that receives the request may record the content requested via a mobile device, such as a phone. For example, a phone application may be configured to both present the request and enable the recording of the response content, optionally at the same time. By way of illustration, if the request includes a request for video content of the recipient, the application may activate a front facing camera of the phone and present a user interface on the phone display showing the image being captured by the front facing camera, where the request may be displayed at the same time. A record control may be provided. When the recipient activates the record control, a recording of the recipient (e.g., discussing the subject matter included in the request) is initiated. A timer (e.g., a countdown counter) may be presented while the recording is in process which may count down a time corresponding to the requested length of the video content. For example, the request transmitted to the user phone application may include the requested length, and the application may load the timer with a corresponding time. Optionally, once the timer has reached a certain value (e.g., 0), the recording may be automatically halted by the application. Optionally, instead, the recording may continue until the recipient activates a stop or pause control (optionally an indication is provided that the recording has exceeded the requested length). The recorded content may be transmitted to the content distribution facilitation system or the content distribution facilitation system may otherwise access the content.

Thus, one or more responses, including requested content or links thereto, may be provided by the requested recipients. The responses may be received by content distribution facilitation system. The content distribution facilitation system may forward the responses to the requester or otherwise notify the requester and enable the requester to access the responses. For example, a user interface provided by the content distribution facilitation system to the requester via a requester terminal may display a listing of responses from which the requester can select. Optionally, a watermark may be embedded in the content provided to the requester for review, to prevent or discourage the use of the content until accepted by the requester and/or paid for by the requester. For example, with respect to video or image content, the watermark may be visual. With respect to audio content, the watermark may be audible. The content may be provided without the watermark once accepted by the requester.

In an example embodiment, the requester may access the responses via a list presented in a web page provided for display by the system, via a dedicated software application, or otherwise. The requester may click on a control, such as a view control, presented in association with a respective response entry, and the corresponding response is presented (e.g., presented as text, video, and/or audio). The requester may then provide, via a user interface, an indication of acceptance of one or more of the responses. The acceptance may be recorded by the system and the system may then charge or invoice the requester for the accepted responses.

Optionally, an interface may be provided enabling the requester to specify reasons as to why the requester did not accept a given response (e.g., the video quality was poor, the camera was shaky, the sound quality was poor, the content was uninteresting, the content included objectionable content (e.g., obscene language, racist language, etc.)). A notification may be transmitted to the responders indicating acceptance or non-acceptance of respective responses (optionally including reasons for non-acceptance provided by the requester), and a confirmation of the acceptance may be transmitted to the requester.

Optionally, content not accepted by the requester may then be offered to others for use on an exclusive or non-exclusive basis (e.g., where the requester affirmatively specifies that the content is not accepted or a predetermined period of time elapses without an acceptance by the requester and so the content is designated by the system as "not-accepted"). For example, other potential licensees/purchasers of the content may be provided by the system with a search interface where they can enter search queries to identify content they may be interested in. By way of further example, such interface may include fields enabling a searcher to specify subject matter criteria (e.g., home runs), author criteria (e.g., a pitcher), content specifications (e.g., format, length, type (e.g., audio video, audio only, images, etc.), availability of exclusive rights, and/or other criteria discussed herein with respect to requester-specified criteria. The system may then return matching search results (if any), with an associated control enabling the searcher to specify they want to licensee/purchase a given item of content identified in the search results. Optionally, the responder may correct the issue(s) identified by the requester and may resubmit the corrected content which the requester may or may not accept, as similarly described above.

After the requester has accepted and received the content, the requester may publish the accepted content accordingly (e.g., in a television program, radio program, online news program, etc.). Optionally, the requester may inform the system where (e.g., which channel, station, online media, URL, etc.) and when (e.g., time and date) the content will be published, and the system will cause a notification to be presented to potential consumers, indicating where and when they can find and view (and/or listen to) the content. Optionally, such a notification is posted on a social networking site associated with the publisher and/or the content contributor indicating (with text, a link, or otherwise) where and when the content can be found. Instead or in addition, the notification may be provided via a microblog, text message, email, or otherwise by the system, content provider, and/or publisher.

Further non-limiting examples of the type of criteria that may be specified by a requester will now be described. A user interface may be provided enabling the user to specify, by way of example:

region (e.g., city),
sport,
team,
accomplishments (all-star, Cy Young award winner, Heisman trophy winner, specified RBI range, specified stolen base range, specified number of consecutive games in which the responder accomplished a specified act, specified number of singles, doubles, and/or triples per game, specified number of at bats, specified passing, rushing, receiving, punting, kick, touchdown accomplishments, etc.),
age range (athletes over 40),
medical condition or procedure (e.g., having a type of surgery, such as ligament reconstruction surgery, having numbness in a limb),
which years played and/or under what coaches,
which bowl games played,
which positions played,
which and how many season games played in,
which and how many post-season/playoff game(s) played in,
which and how many world series games played in, etc.

By way of further example, for movie or television related content, the criteria may specify:

profession type (e.g., actor, writer, director, editor, composer, set designer, etc.),
award-types won (e.g., Academy Award, People's Choice Award, Critics Award, Emmy Awards etc.),
award category (e.g., Best Actor, Best Actress, Best Supporting Actor, Best Supporting Actress),
movies appeared in or otherwise participated in,
television shows appeared in or otherwise participated in, etc.

By way of further illustration, an online newspaper or other news site may be publishing an article regarding a crime, such as a murder. The publisher may want audio commentary regarding the crime from a psychologist. The publisher may submit a request to the system for audio content, of a specified length, commenting on the subject of the crime, from a psychologist having an expertise in criminal psychology. The system may identify psychologists meeting the publisher's criteria, and transmit the request to some or all of the identified psychologists. The responses, including audio content, may be received by the system and made available to the publisher (e.g., via a website, dedicated application, or otherwise). The publisher may listen to the audio content from several or all of the responses from the psychologists. The publisher may accept a response. The publisher may then embed in the article a link to the audio content. A user can then read the article and activate the link in order to hear the audio content.

An application programming interface may be provided enabling third party systems to gain access to some or all of the services provided by the content distribution facilitation system. The operator of a third system may pay a licensing fee for such access.

The operator of the system may utilize one or more fee arrangements to obtain compensation for the services provided and to reimburse the fees paid to content providers. By way of example, publishers may pay a periodic subscription fee in order to utilize the system and obtain the right (e.g., the exclusive right for a least a period of time) to utilize content provided by content providers (e.g., athletes, celebrities, medical personal, etc.) and accepted by the requester. Optionally, the subscription service may only enable the requester to issue requests for and/or accept a specified number of items of content within a specified period of time (e.g., the requester may only be permitted to submit 5 requests per month).

Compensation may also be received from sponsors and advertisers. Optionally, a content contributor responding to a request may be compensated in whole or in part via compensation sponsored by a third party (e.g., that wants to advertise its goods, services, or brand name). For example, a contributor may be given a gift card (which may be a new gift card or a recharge of value of a gift card previously distributed to the contributor) for each submission (or for a specified number of submissions), the gift card provided in association with an advertisement from a sponsor that is paying for all or a portion of the gift card value.

Optionally, in addition or instead, the content contributor may be provided with a portion of the revenue from a sponsor sponsoring a show, newspaper, or other medium using and distributing the content. For example, if the content is a 1 minute video of an athlete content contributor being displayed during a broadcast of a live game, the video may be introduced as "this minute of baseball starring John Smith is presented by [sponsor name]". The sponsor may pay to have their brand associated with the video, and the athlete may receive some or all of the sponsorship fees. Optionally, the content contributor may be paid a fixed amount. Optionally, certain requesters (e.g., companies) may request the responder (e.g., a celebrity, such as an athlete or actor) to perform product placement acts and compensate the responder accordingly. For example, a company may request, and pay a fee for certain celebrities to say "Happy Mother's Day" while holding a food product provided by the company. By way of further example, certain requesters (e.g., companies) may request that the responder include the requester's logo (e.g., via a watermark or otherwise) into videos submitted by the responder in response to a request from the requester offering payment for inclusion of the logo and/or to requests from other requesters and/or for videos distributed by one or more specified media partners. The logo may be provided by the requester and inserted by the responder, the system, or otherwise.

Optionally, the amount the content contributor is paid for his or her contribution may vary and may be determined based on one or more of the following factors and/or other factors:
- length/size of content;
- type of content (e.g., video, audio, text);
- type of use by publisher (e.g., television, radio, printed newspaper, online newspaper, online broadcast, blog, pushed out to users (e.g., via email, SMS, website, microblog, etc.), etc.);
- timing of the provision of the content from the contributor (e.g., how long after the content request was submitted the content was received by the publisher);
- length of exclusivity;
- etc.

Optionally, a requester can request items other than publishable content. For example, a requester may specify that they want a specific type of item of memorabilia from a specific potential responder and/or from a responder selected from a group of responders that satisfy the requestor's criteria. As similarly described above, the criteria may be specified via a user interface provided by the system. For example, the requester may request a signed baseball from a specific baseball player, or the requester may request a signed baseball from any current player on a specified baseball team. The requester may also specify a time frame in which the memorabilia needs to be received by the requester. For example, the requestor may want to ensure that the memorabilia is received by a designated gift recipient in time for the gift recipient's birthday.

The system may access its database to identify potential responders that satisfy the requester criteria, and transmit the request to some or all of the identified potential responders. If a potential responder accepts the request, the system may receive the acceptance and notify other potential responders that the request has been taken and is no longer available to service. The responder that accepted the request then provides the requested memorabilia to the requestor. A fixed fee may be specified for different types of memorabilia, or the requester may specify in the request how much they are willing to pay for the memorabilia, and the potential responder may determine whether they want to satisfy the request based at least in part on the fee amount. The responder is correspondingly compensated and the requester is correspondingly charged.

The foregoing process may be similarly performed by the system for other types of requests. For example, a requester may request that a specific potential responder (e.g., a specified athlete, musical performer, actor, celebrity, etc.) or a potential responder satisfying criteria specified by the user, provide a recorded video of the potential responder singing happy birthday, wherein the rendition of happy birthday is to include the recitation of a specified recipient of the video (e.g., a boy or girl whose birthday it is). By way of further example, the request may be a request to answer a question by the requester (e.g., regarding a statistic, opinion (e.g., who was the best play at a specified position) or a personal fact of the potential responder. Optionally, the request may include text that the responder is to recite in the response (e.g., where the text may include the name of a host of a show on which the content is to be used, such as "Hello, Joe, let me tell you what I think of the last play . . . "). Such requests and responses may be processed as similarly discussed above, and the content may be provided to the requester and/or directly to a specified gift recipient (e.g., via a video download file, streaming media, a DVD, or otherwise).

Optionally, the system enables users (e.g., celebrities, athletes, etc.) to create unsolicited content and offer the content to potential content consumers (e.g., publishers, individual end-users, etc.). The user may tag the content with appropriate descriptors. For example, the tags may indicate the media type, the media length, the media content subject matter, the user's credentials and/or resume information (e.g., the user's profession, awards, notable accomplishments, area of expertise, etc.), the use fee, etc. The user may also specify specific users (e.g., producers or broadcasters of specific television shows) and/or specific types of users (e.g., producers or broadcasters of sports programs) to whom the content offer is to be made. The content offer may then be sent out to the potential consumer(s) as specified by the user.

Optionally, the system may access accounts of potential consumers of the content, and determine if the potential content consumers have requested to be notified when content that meets specified criteria has become available for publishing. The system may compare the specified criteria from one or more potential content consumers with the tags, and if there is a sufficient match (and optionally only if the potential consumers match the user's criteria), notify potential content consumers of the content which they may accept or not accept as similarly described above, and for which compensation may be paid as similarly discussed above.

For example, an athlete may want to make a significant announcement by recording a video offering it via the system to different media partners. Optionally, rather than offering an already recorded video, the athlete offer may state a subject regarding which the athlete is willing to provide content on. For example, if an athlete was recently in an accident which ended his professional playing career, the offer may be an offer to record a video where the athlete would discuss his feelings and health. The offer may specify a price, format (e.g., encoding type (e.g., MP4, AVI, MOV, etc.), number of pixels in the height and width dimensions, etc.) and/or length.

Optionally, the system includes a bidding engine enabling potential content consumers to bid on the content (or the offer to record the content). The auction winner's rights may include exclusive access to the content, time-limited exclusive access, distribution-limited access, and non-exclusive rights.

If the offer is an offer to record content, an accepting media partner may specify a length, format, and content details that the media partner expects or requires with respect to the content to be recorded by the athlete. Optionally, the athlete may refuse the media partner's acceptance if the requirements set forth by the media partner are not acceptable to the athlete.

The system operator may, in certain embodiments, retain or be paid a percentage of a fee paid by requestor or a sponsor, or a flat fee, for the use of a given item of content or a certain number of content items. The system operator may, in certain embodiments, be paid a portion of advertising and/or sponsorship fees associated with the use of an item of content. The content contributors may optionally specify charities or other non-profits to which some or all of the compensation due to the contributor may be contributed.

Optionally, the system operator may submit requests to potential responders on its own behalf, where the system operator may act as a publisher. For example, the system operator may submit a question to multiple athletes regarding an event (e.g., "identify and discuss the most satisfying pitch you have thrown") and assemble content from some or all the responses into a single item of content. The system operator may then license the assembled content (and/or the individual responses) to a third party and/or post the assembled content (and/or the individual responses) on a site, such as a publically accessible website.

Certain embodiments may track how many items of content a given user has submitted and/or how many items of submitted content have been accepted. Such contributing users may be ranked based on such tracked information, and the rankings may be published via social media (e.g., social network, blog, etc.), or otherwise. This may incentivize users to increase their content contributions and the quality of their content contributions.

Figure 1:
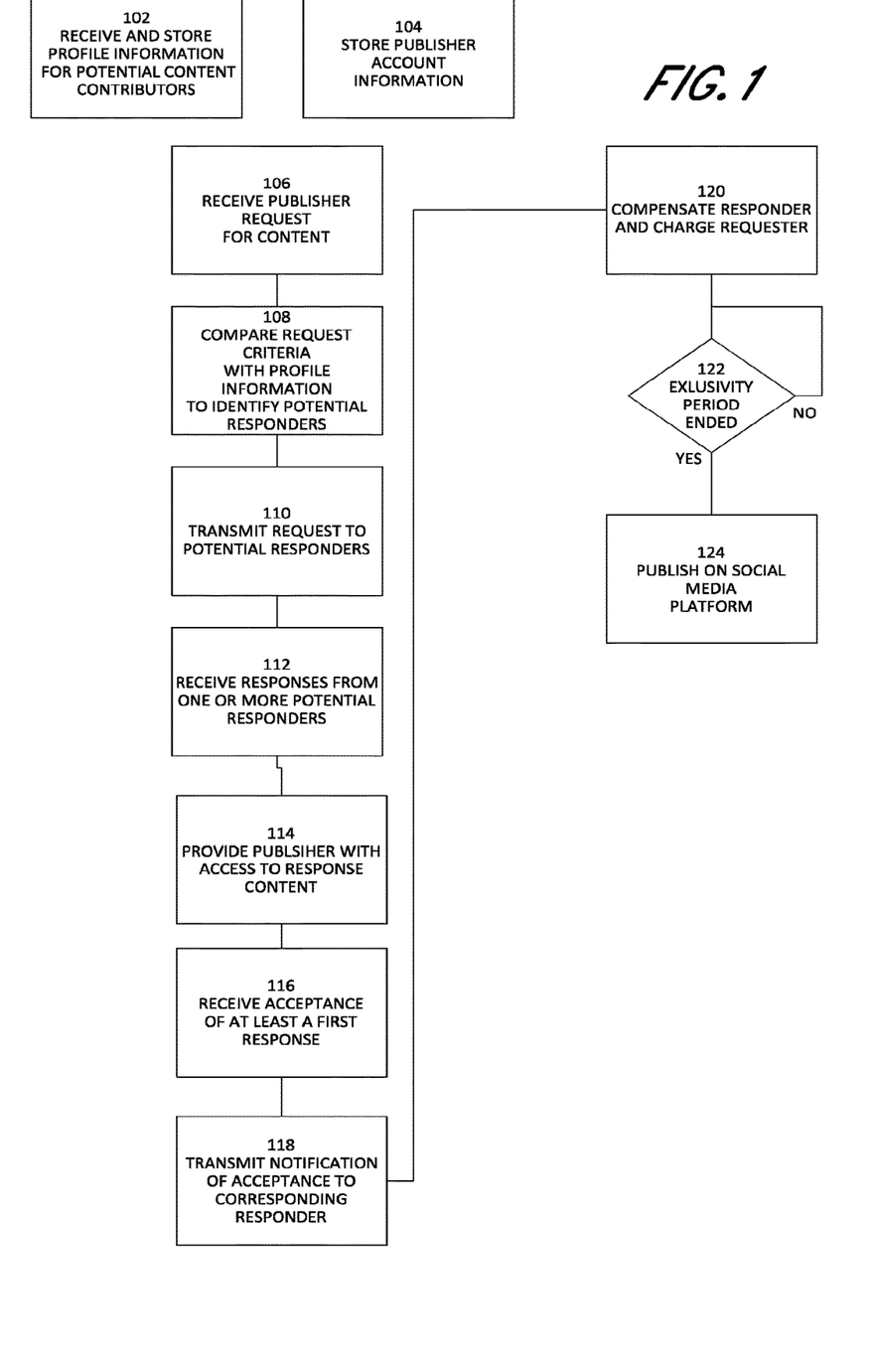
FIG. 1 illustrates an example process.

Referring to FIG. 1, an example process is illustrated. At state 102, profile information for potential contributors is received and stored in a database as similarly described above. At state 104, account information for potential content publishers is received and stored (e.g., publisher name, content information, payment related information (e.g., a payment source identifier, such as a credit card or deposit account), etc.). At state 106, a request for content from a content publisher is received at a system. As discussed above, the request may include criteria describing responders that should be targeted with the request (e.g., an athlete that had achieved a specified milestone), and the type of content desired (e.g., a 2 minute video wherein the athlete describes his feels at achieving the milestone). The request may specify a deadline for providing a response, the amount of compensation that will be paid, a desired period of exclusivity, the type of use to which the content will be put, and/or other information. The request may include content, such as a video file or image, or a link to a video file or image, that responders are requested to provide comments on (e.g., in the form of video comments) in their submission. For example, the video file may include a segment from a sporting event (e.g., a knockout in a boxing match) or a television show (e.g., a statement from a guest on a talk show) that the responders are being requested to provide comments on. For example, the system operator may create a channel on a third party site that hosts video content.

By way of example, a media request user interface may be provided to a potential content publisher. The user interface may ask to identify a field of interest (e.g., sports, entertainment, etc.). If, for example, the content publisher selects sports, a menu of sports/sports leagues may be presented to the content publisher from which the content publisher may select. For example, the menu may list MLB, NBA, NFL, NHL, and/or other sports leagues. Based at least in part on the league/sports selection, the system may optionally select a sport attributes user interface to display to the publisher. For example, the sport attributes user interface may list teams corresponding to the selected league, player positions corresponding to the league sport (e.g., baseball player positions, football player positions, etc.), non-player professions (e.g., agent, coach, scout, medical, etc.) from which the publisher may select. The publisher's selections may then be received and stored by the system as request criteria. Optionally, the publisher may also have previously defined a "favorites" list of experts. A user interface may optionally be provided to the publisher listing the favorites that meet some or all of the other request criteria specified by the publisher, where the publisher can select one or more of the favorites to whom the request should be sent to.

At state 108, the system utilizes at least a portion of the requester specified criteria to identify profiles of potential contributors in the database that sufficiently match. At state 110, the content request is transmitted to the identified matching potential contributors. At state 112, responses are received by the system from one or more potential contributors. The content may optionally be stored with tags corresponding to some or all of the request criteria (e.g., sport, position, player, team, etc.), time stamped (e.g., with date/time of receipt), and assigned a state of "pending". At state 114, the publisher is provided access to the response(s), including the content. The content may be watermarked before providing the publisher access to the content. At state 116, the system receives a selection and acceptance of at least one response from the publisher. At state 118, the system transmits a notification acceptance to the corresponding responder and optionally assigns the content a status of "complete". At state 120, the responder whose content was accepted is compensated and the publisher is charged for the content. Optionally, the system operator also receives compensation as similarly described above. The publisher may then be provided the content without the watermark (e.g., as a download file, a link, via streaming media, or otherwise). At state 122, a determination is made as to whether the period of exclusivity has ended. If the period of exclusivity has ended, the content may be published via a social media platform and/or offered to other publishers for publication.

Figure 2:
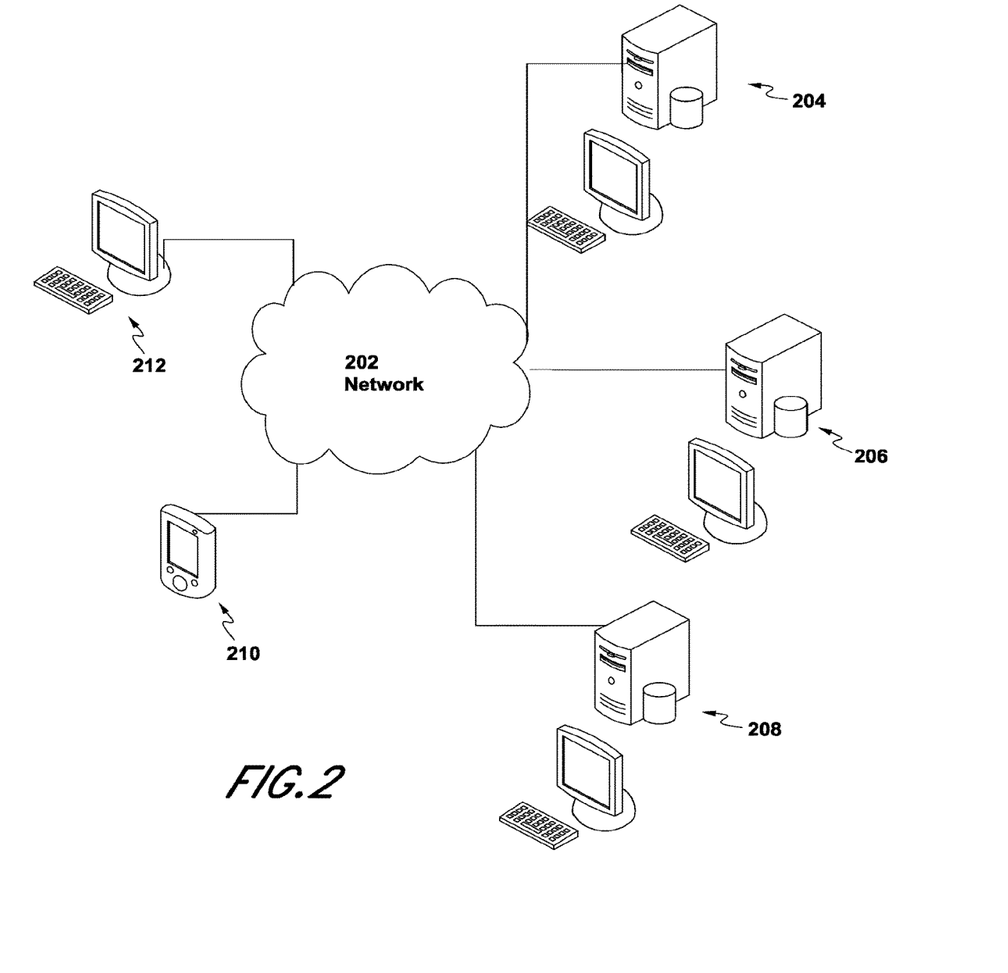
FIG. 2 illustrates an example environment.

Referring to FIG. 2, an example environment and architecture is illustrated. A content distribution facilitation system 204 includes a data store storing profiles of potential content contributors as similarly described above. The content distribution facilitation system 204 may be configured to perform some or all of the functions and processes described above, such as those discussed with respect to FIG. 1. The content distribution facilitation system 204 may be coupled over a wired and/or wireless network to one or more publisher systems 206 and 208, from which content requests may be received, and to which content responses from content contributors may be provided. A content contributor system 210 may be in the form of a mobile phone with a camera and a browser and/or application installed to access the user interfaces discussed above, to record requested content, and to provide the recorded content to the content distribution facilitation system 204. The recorded content may then be published by a publisher system, and viewed by a user, such as a fan, via a user terminal 212, which may be a computer, television, or other terminal type.

Figure 3:
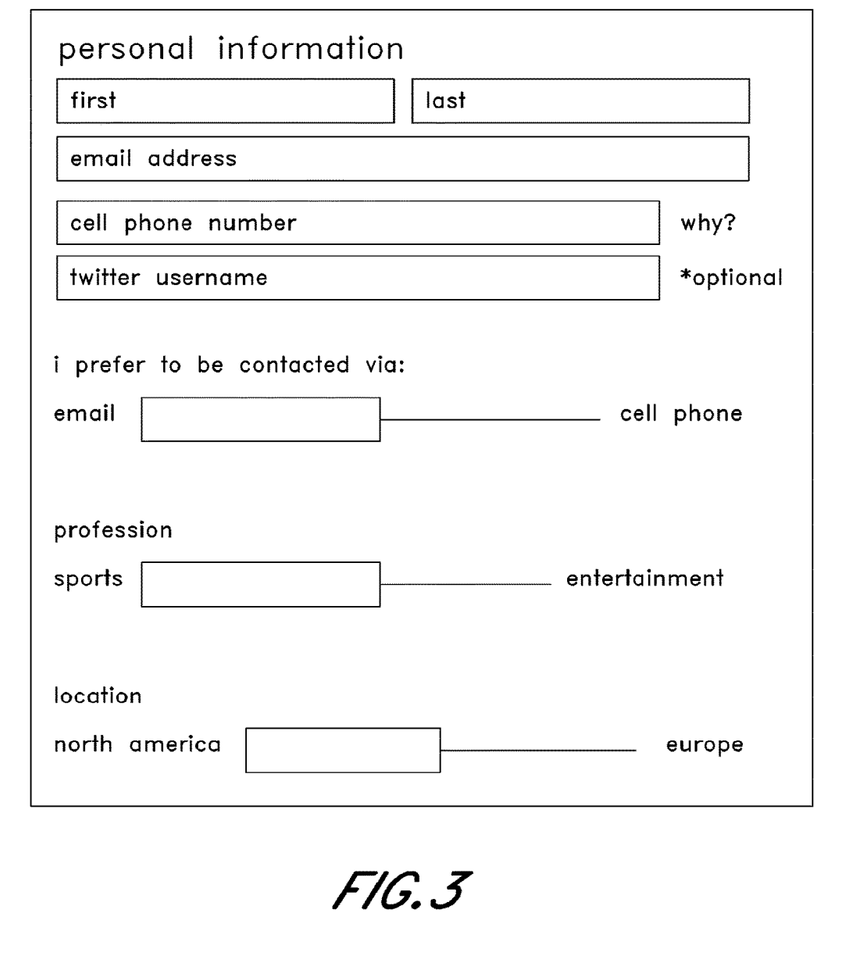
FIGS. 3, 4, 5, 6, and 7 illustrate example user interfaces.

Referring now to FIG. 3, and example interface is illustrated enabling a user to register as a potential responder. The user interface includes fields configured to receive some or all of the following: the user's name, email address, mobile phone number, microblog user name (for Twitter® in this example), a preference indication for how the user wants to be contacted (e.g., email, SMS, phone, etc.), the user's profession/expertise (e.g., sports, entertainment, etc.), and location (e.g., where the user can enter high-level location information, such as North America, South America, Europe, etc.). The information received by the user may then be stored by the system. As described elsewhere herein, the location and profession information may be used by the system to determine which users should be sent a given request for content.

Figure 4:
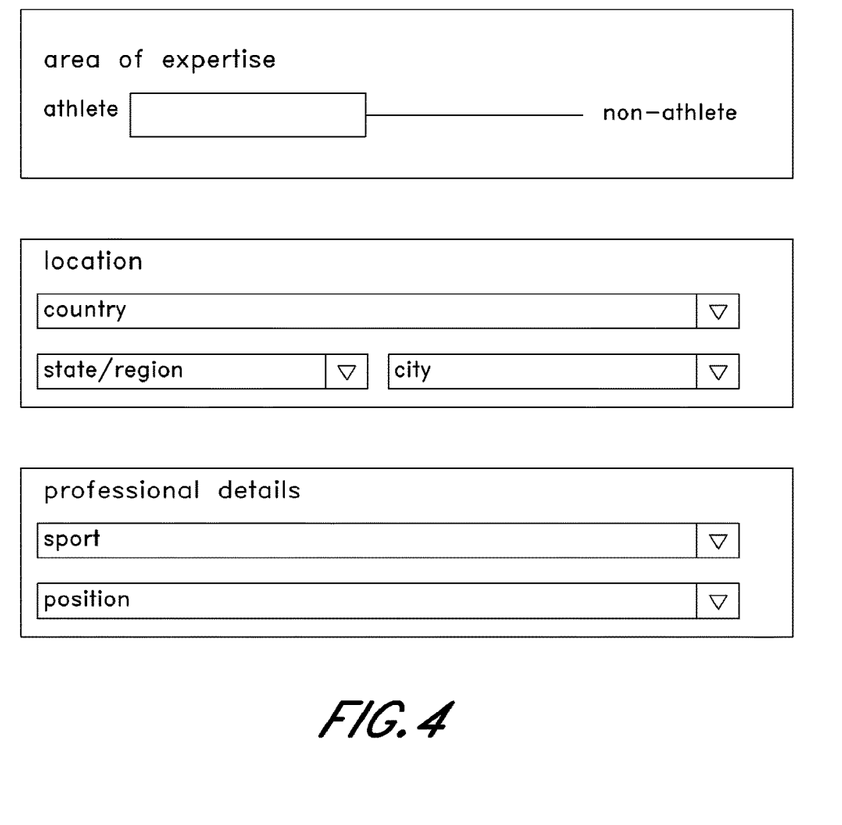

FIG. 4 illustrates an example interface enabling the user to provide more information regarding the user's profession/expertise. In this example, the user indicated via the user interface of FIG. 3, that the user's profession is sports, and so the system selected a sports user interface to be presented to the user to collect additional related information. The example user interface includes an area of expertise field via which the user can indicate whether the user is an athlete or a non-player (e.g., where the user may be a sports agent or scout), location fields to receive more detailed location information (e.g., country, state/region, city, etc.), and profession details (e.g., sport type and team). Optionally, the user interface may provide a menu (e.g., a drop down menu) that presents certain sports and/or sports leagues from which the user may select (e.g., Major League Baseball (MLB), National Basketball Association (NBA), National Football League (NFL), National Hockey League (NHL), etc.). In this example, the system may select and provide a menu of sports team choices via which the user can select a team, where the menu of choices is based on the user's sport selection. For example, if the user selects MLB, the sports menu may present a list of MLB teams from which to select. Optionally, the user interface may enable the user to select several teams that the user has been associated with. The information received by the user may then be stored by the system.

If the user indicated via the user interface illustrated in FIG. 3 that the user is an non-player (but is involved in the sports field), then a user interface may be provided asking the user to select a sport, as similarly described above with respect to FIG. 4. For example a menu may be provided that presents certain sports and/or sports leagues from which the user may select. A user interface may be provided asking the user to identify a non-player profession (e.g., by selected from a dropdown menu from a set of professions, such as official, agent, medical, coach, scout, management, family, journalist, celebrity fan (e.g., a movie star)), and optionally in what years for one or more of the teams selected via the user interface illustrated in FIG. 3.

If the user indicated via the user interface of FIG. 3, that the user's profession is entertainment, the system may select an entertainment user interface to be presented to the user to collect additional information. For example, a menu may be presented asking the user to indicate what type of entertainer the user is (e.g., actor, musician, comedian, singer, director, producer, agent, etc.). The information received by the user may then be stored by the system.

Figure 5:
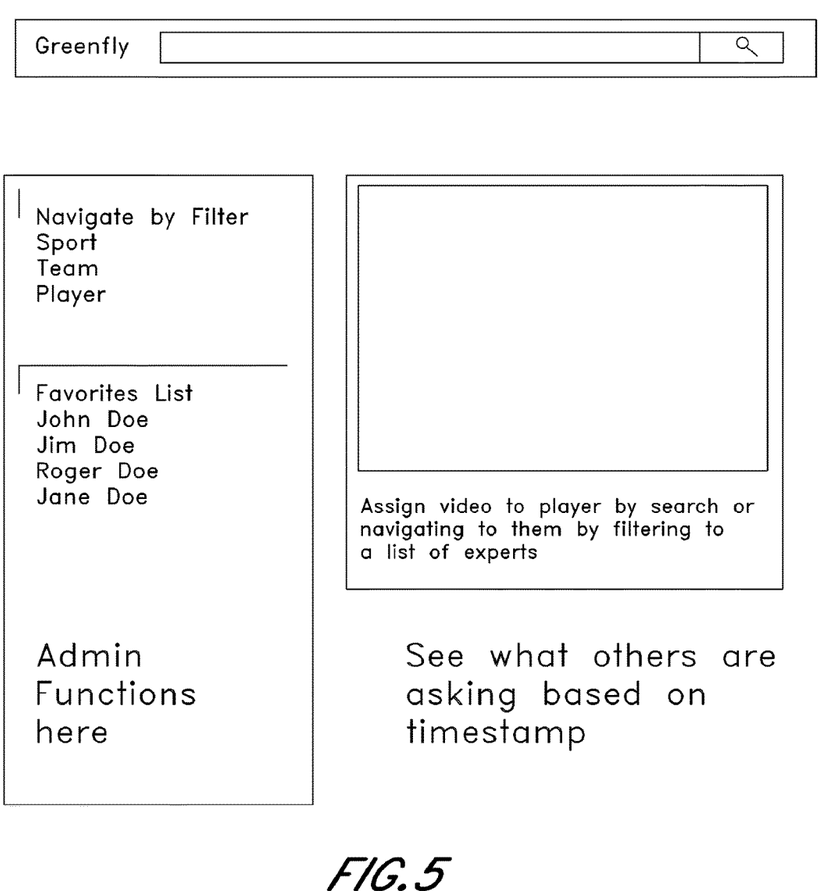

FIG. 5 illustrates an example content request submittal user interface. The example user interface may include fields via which the user can specify a sport, team, and/or player as part of the request criteria, may include a list of experts previously designated as favorites or preferred by the user, a field for receiving a request, and/or a list of content (e.g., video content) provided in response to a previous request. The user may select an item of content to view, and may accept or reject the content. Optionally, a list of requests submitted by other users may be presented, optionally with timestamps, enabling the user to determine what subjects may be of high interest for a given time period.

Figure 6:
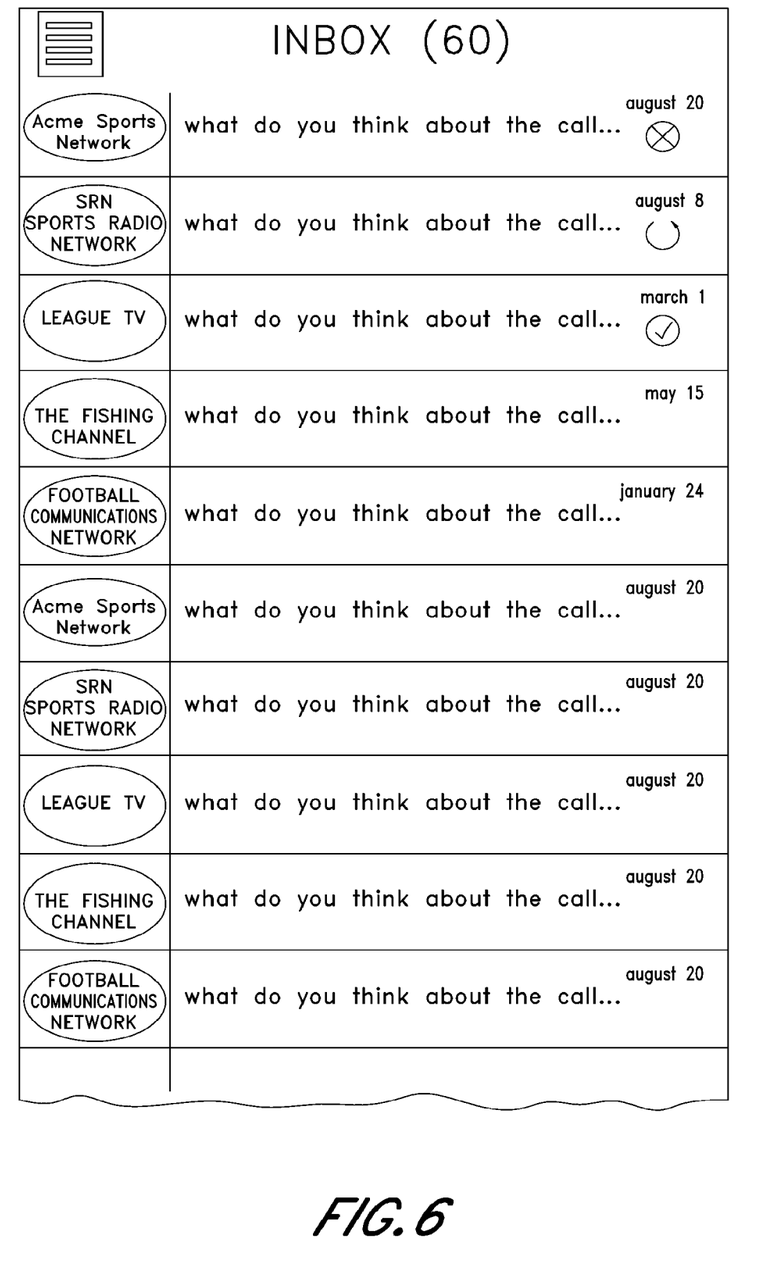

FIG. 6 illustrates an example user interface as it may be displayed on a device (e.g., a mobile telecommunications device) of a potential responder, optionally via a dedicated application as similarly discussed elsewhere herein, via a web page, or otherwise. In this example, a content request inbox is provided which visually lists content requests transmitted to the potential responder device by a remote system, such as that discussed above. In this example, a requester field is provided via which the requester is identified, optionally by name and/or icon (e.g., a trademark of the requester). Optionally, all or a portion of the content request is displayed is a request subject field. The date and/or time the request is received and/or the date and/or the time set by the requester for the request response may optionally be displayed in date field. Optionally, the status of the request may be displayed. For example, the status may indicate that the potential responder has submitted a response, and an indication as to whether the response was accepted (e.g., via a checkmark or other indicator), is pending (not accepted or rejected) e.g., via a circular arrow or other indicator), or has been rejected (e.g., via an "X" or other indicator). The status may optionally be tracked and transmitted to the device by the remote system. Optionally, a status indication may be provided indicating that the deadline for submitting a response has passed and/or that a response from another responder has already been accepted by the requester for a given content request. Optionally, the application or the system filters out requests where the deadline for submitting a response has passed so that such requests are no longer displayed in the content request inbox. The list of requests may be ordered automatically or in response to a potential responder instruction (e.g., provided by activating a sort control) by the date/time request was received, by date/time the request response is due, by requester name, or by subject. An indicator may be provided to indicate whether or not the potential responder has opened a given request. For example, bolding, underlining, and icon, or lack thereof may be used to indicate that a request has or has not been viewed.

Figure 7:
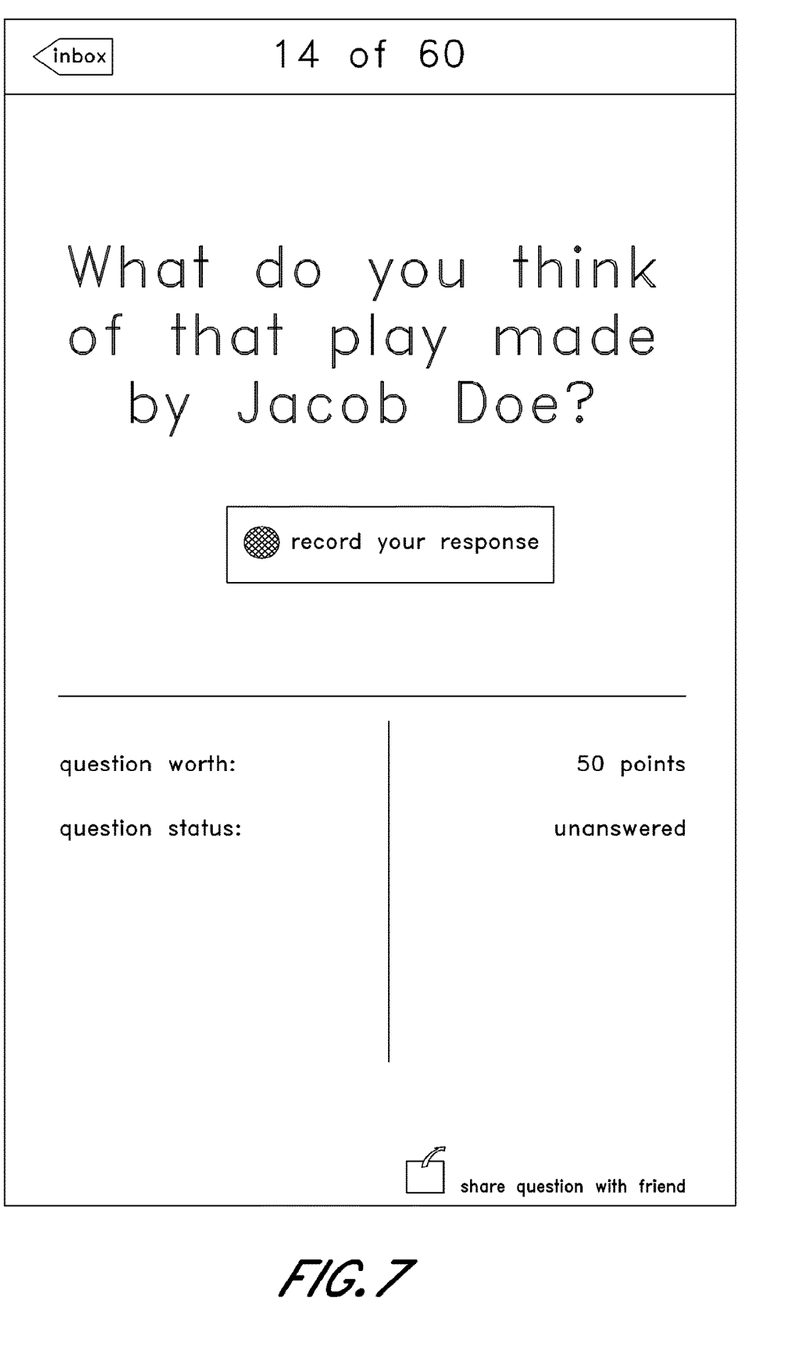

FIG. 7 illustrates an example user interface that may be displayed when the potential responder selects an item from the request inbox, such as that illustrated in FIG. 6. The user interface may display the full content request text and optionally other content request criteria (e.g., length, type, format, and/or other criteria discussed herein). The user interface may also provide compensation information (e.g., an accepted response is worth 50 points, $50 dollars, or other type or amount of compensation). A record control may be provided, which when activated by the responder may initiate recording (e.g., voice and/or video) by the responder's device. The user interface may optionally also provide status information with respect to the content request, as similarly discussed above with respect to FIG. 6.

Optionally, when the responder activates the record button to initiate a video recording, the request question and/or text that the request instructs the responder to recite, is positioned, sized, and/or segmented by the application to be positioned near the responder device's camera lens. This will cause the responder's eyes to be looking at the lens region when reading questions and/or text, resulting in a better video. Optionally, the application will only display one or two lines of text at a time (the question text and/or the text the responder is asked to recite) adjacent to the lens (e.g., just below the lens), to better ensure that the responder's eyes are continuously directed to the camera lens area during the video recording. If the text is too long to display on one line (or two lines) adjacent to the lens, the application may advance the text by scrolling the next portion of the text onto the device's display and scrolling off the previous portion of the text, to ensure the next displayed text is also displayed adjacent to the lens. The scrolling or other technique for changing the text may be performed in response to detecting a responder text advance command, automatically based on a desired pace of reading, or otherwise.

Thus, certain embodiments enable requests for content to selectively be submitted to a specific target group of potential responders, such as athletes, actors, opinion leaders, industry experts, celebrities, a social or working group, or the like, and further enable information and content received from responders to be distributed over one or more distribution channels.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., comprising databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Processes described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for social networking and/or communications activities, installed on the user's mobile phone, laptop, pad, desktop, television, set top box, phone, or other terminal. For example, an app may be downloaded to a user mobile device, such as a smart phone. Various features described or illustrated as being present in different embodiments or user interfaces may be combined into the same embodiment or user interface.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A system, comprising:
   at least one computing device comprising hardware;
   a networking interface coupled to the at least one computing device;
   non-transitory memory coupled to the at least one computing device that stores instructions that when executed by the at least one computing device cause, at least in part, the system to at least:
   maintain a data store of profiles of content contributors, the data store including an identification of professions associated with at least a portion of the content contributors, wherein the identified professions for the portion of the content contributors include at least one of the following: athlete, entertainer, agent, athlete scout, medical expert, industry expert, actor, producer, director, comedian, musician, or celebrity;
   provide one or more user interfaces comprising:
      a search query interface configured to receive content contributor criteria to be used in a search for content contributors;
      a content subject matter interface configured to receive a request to be provided to a selected content contributor for video and audio content of the given content contributor discussing a specified subject;
      an interface enabling the requester to save a list of preferred content contributors;
      an interface configured to display the saved list of preferred content contributors;
      an interface enabling the requester to select one or more of the preferred content contributors from the displayed saved list of preferred content contributors;
      an interface enabling the requester to selectively indicate whether the content request is to expire at a specified date and/or time;
   receive, via the network interface, a request for content from a first requester, the content request comprising content criteria, comprising:
   content contributor criteria provided via the content contributor criteria interface or a selection of one or more preferred content contributors from a list of saved preferred content contributors of the first requester;
   a content subject matter specification provided via the content subject matter interface, including a request for video and audio content of a content contributor discussing a first specified subject;
   transmit at least a portion of the content request content criteria, including the content subject matter specification, to a mobile communication device of a first content contributor, the first content contributor selected by the first requester from the list of saved preferred content contributors of the first requester or identified at least partly as a result of a search performed by the system in response to the content contributor criteria received from the first requester;

cause at least a first item of content captured by the camera of the mobile communication device of the first content contributor to a be automatically posted to social media associated with the first requester, wherein the social media includes other content.

2. The system as defined in claim 1, wherein the request for content from the first requester includes a requested content time length and the system is configured to cause a countdown timer presented to the mobile communication device of the first content contributor to have a countdown time corresponding to the requested content time length and wherein the system is configured to transmit text to be displayed to the mobile communication device and cause the mobile communication device to display the text to be read by the first content provider while the countdown timer is displayed.

3. The system as defined in claim 1, wherein the request for content from the first requester includes a requested content time length and the system is configured to cause a countdown timer presented to the mobile communication device of the first content contributor to have a countdown time corresponding to the content time length specification.

4. The system as defined in claim 1, wherein the system is configured to transmit text to be displayed to the mobile communication device and cause the mobile communication device to display the text to be read by the first content provider while recording the first item of content.

5. The system as defined in claim 1, wherein the system is configured to automatically detect when a second content contributor is viewing a first live program via an application or application programming interface installed on the mobile communication device of the second content contributor and at least part in response cause a content request to be transmitted to the second content contributor.

6. The system as defined in claim 1, wherein the system is configured to transmit the content request to the mobile communication device of the first content contributor via a short messaging service (SMS) message or a multimedia messaging service (MMS).

7. The system as defined in claim 1, wherein the system is configured to transmit the content request to the mobile communication device of the first content contributor using an application installed on the mobile communication device.

8. The system as defined in claim 1, wherein the social media comprises a social network page, a blog, and/or a microblog.

9. The system as defined in claim 1, wherein the system is configured to determine if one or more users have requested to be notified when content that meets specified criteria becomes available, and in response to detecting that an item of content meets criteria specified by a given user, enable a notification regarding the item of content that meets the criteria specified by the given user be transmitted to the given user.

10. The system as defined in claim 1, wherein the system is configured to enable notifications regarding the posting of the first item of content to be transmitted to users, the notifications including a link to the posted the first item of content.

11. The system as defined in claim 1, wherein:
the request includes a video file, or a link to a video file, or both a video file and a link to a video file and wherein transmitting at least a portion of the content request content criteria to the first content contributor further comprises transmitting the video file, or the link to a video file, or both the video file and the link to a video file to the first content contributor;
the system is configured to track status of a plurality content requests and to provide the status for display to the requester; and
the first requester is provided an exclusive right to the first item of content captured by the camera of the mobile communication device of the first content contributor.

12. The system as defined in claim 1, wherein the content contributor criteria comprise an indication that a contributor is currently viewing a first specified program and the system is configured to identify content contributors that are currently viewing the first specified program.

13. The system as defined in claim 1, wherein the system is configured to track status of a plurality content requests and to provide the status for display to the requester.

* * * * *